(12) United States Patent
Hanssen

(10) Patent No.: US 9,830,245 B2
(45) Date of Patent: *Nov. 28, 2017

(54) TRACING EVENTS IN AN AUTONOMOUS EVENT SYSTEM

(71) Applicant: Atmel Corporation, San Jose, CA (US)

(72) Inventor: Ingar Hanssen, Tiller (NO)

(73) Assignee: Atmel Corporation, San Jose, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/929,605

(22) Filed: Jun. 27, 2013

(65) Prior Publication Data

US 2015/0006969 A1 Jan. 1, 2015

(51) Int. Cl.
G06F 11/00 (2006.01)
G06F 11/34 (2006.01)
G06F 11/30 (2006.01)

(52) U.S. Cl.
CPC ........ *G06F 11/348* (2013.01); *G06F 11/3037* (2013.01); *G06F 11/3476* (2013.01); *G06F 2201/835* (2013.01)

(58) Field of Classification Search
CPC ............ G06F 11/3636; G06F 2201/86; G06F 11/3466; G06F 11/348; G06F 11/3072; G06F 11/3476; G06F 11/3648; G06F 11/0781; G06F 11/366; G06F 2201/835; G06F 2201/865; G06F 2201/88; G06F 9/542; G06F 11/3612; G06F 11/3037
USPC ......................................................... 714/45
See application file for complete search history.

(56) References Cited

U.S. PATENT DOCUMENTS

| | | |
|---|---|---|
| 5,896,524 A | 4/1999 | Halstead et al. |
| 6,018,809 A | 1/2000 | Garrett |
| 6,026,501 A | 2/2000 | Hohl et al. |
| 6,047,124 A | 4/2000 | Marsland |
| 6,145,100 A * | 11/2000 | Madduri ......................... 714/45 |
| 6,345,295 B1 | 2/2002 | Beardsley et al. |
| 6,732,307 B1 * | 5/2004 | Edwards ....................... 714/724 |
| 6,802,031 B2 * | 10/2004 | Floyd et al. .................... 714/45 |
| 6,912,673 B1 * | 6/2005 | Wyland .......................... 714/43 |
| 6,920,586 B1 | 7/2005 | Moyer |
| 7,043,668 B1 * | 5/2006 | Treue et al. .................... 714/45 |
| 7,076,767 B1 | 7/2006 | Williams |
| 7,231,339 B1 | 6/2007 | Nemecek et al. |
| 7,330,809 B2 * | 2/2008 | Tabe ............................. 703/23 |

(Continued)

OTHER PUBLICATIONS

Non-final rejection for U.S. Appl. No. 13/929,554, dated Apr. 10, 2015, 8 pages.

(Continued)

*Primary Examiner* — Elmira Mehrmanesh
(74) *Attorney, Agent, or Firm* — Fish & Richardson P.C.

(57) ABSTRACT

Systems and methods for generating event trace records are described. One example system includes an event subsystem that receives signaling events generated by one or more associated peripheral devices. The system includes a trace module which is coupled to the event subsystem. The trace module receives the signaling events, samples the received signaling events, receives timestamps, and generates event trace records. Each event trace record includes the sampled signaling events and a respective timestamp indicative of the sampling time. The trace module can generate save commands, and deliver the event trace records and the save commands as outputs.

16 Claims, 5 Drawing Sheets

(56) References Cited

U.S. PATENT DOCUMENTS

| | | | |
|---|---|---|---|
| 7,464,301 B1 * | 12/2008 | Entezari et al. | 714/45 |
| 7,490,271 B2 * | 2/2009 | Higashida et al. | 714/45 |
| 7,712,084 B2 | 5/2010 | Beuten et al. | |
| 8,407,528 B2 * | 3/2013 | Larson | 714/45 |
| 8,499,201 B1 | 7/2013 | Chiu et al. | |
| 9,256,399 B2 * | 2/2016 | Hanssen | G06F 11/3636 |
| 9,645,870 B2 * | 5/2017 | Hanssen | G06F 11/0706 |
| 2002/0026544 A1 | 2/2002 | Miura | |
| 2002/0188831 A1 | 12/2002 | Jackson et al. | |
| 2002/0194401 A1 | 12/2002 | Sakugawa | |
| 2004/0199823 A1 | 10/2004 | Dodson et al. | |
| 2005/0033553 A1 | 2/2005 | Swaine et al. | |
| 2005/0193277 A1 | 9/2005 | Horikawa et al. | |
| 2007/0074081 A1 * | 3/2007 | DeWitt et al. | 714/45 |
| 2008/0133838 A1 | 6/2008 | Higuchi et al. | |
| 2009/0323708 A1 * | 12/2009 | Ihle | G06F 13/28 370/402 |
| 2010/0077143 A1 | 3/2010 | Reid et al. | |
| 2010/0107143 A1 * | 4/2010 | Emberling | 717/128 |
| 2011/0219376 A1 | 9/2011 | Williams et al. | |
| 2011/0320745 A1 | 12/2011 | Zhang et al. | |
| 2013/0159780 A1 | 6/2013 | Bedwell et al. | |
| 2013/0254596 A1 | 9/2013 | Eder et al. | |
| 2015/0006965 A1 | 1/2015 | Hanssen | |
| 2015/0006970 A1 | 1/2015 | Hanssen | |

OTHER PUBLICATIONS

Non-final rejection for U.S. Appl. No. 13/929,617, dated May 4, 2015, 17 pages.

NN9012465 "Monitoring of Computer Systems Input/Output Bus Functions", Dec. 1, 1990, IBM Technical Disclosure Bulletin, vol. 33, lss. 7, pp. 465-467.

U.S. Final Office Action in U.S. Appl. No. 13/929,617, dated Aug. 18, 2015, 18 pages.

* cited by examiner

TRACING EVENTS IN AN AUTONOMOUS EVENT SYSTEM

TECHNICAL FIELD

This disclosure relates generally to electronics including controllers.

BACKGROUND

Microcontrollers can be used for controlling other devices. Devices that can be controlled by microcontrollers include analog to digital converters, digital to analog converters, input and output ports, DMA controllers, coprocessors, and memories.

The devices that are controlled by a microcontroller can send and receive information in the form of a signaling event. Signaling events can be used to inform the microcontroller and/or the other devices of events, such as changing a state of a specific device. A device can respond to a signaling event received from another device or the microcontroller and can perform a corresponding action.

Increasing the number of devices in a system can increase the number of signaling events that occur. In some architectures, an event system can be provided that includes multiplexers that route the signaling events among the devices as well as the microcontroller.

SUMMARY

In one aspect, a controller system includes an event subsystem that receives signaling events generated by one or more associated peripheral devices; and a trace module coupled to the event subsystem. The trace module receives the signaling events, samples the received signaling events, receives timestamps, generates event trace records, wherein each event trace record includes a sampled signaling event and a respective timestamp indicative of the sampling time, generates save commands, and delivers the event trace records and the save commands as outputs.

In another aspect, a method includes receiving signaling events for one or more peripheral devices; receiving timestamps corresponding to an event time for a given signaling event; sampling the received signaling events including identifying one or more unmasked signaling events; receiving timestamps corresponding to a sampling time for the one or more unmasked signaling events; generating event trace records, wherein each event trace record includes a sampled unmasked signaling event and a respective timestamp indicative of the sampling time; generating save commands in response to changes of the unmasked signaling events; and saving an event trace record in response to a save command in an external device.

Implementations may include one or more of the following features. The trace module may include a latch module that samples the received signaling events, a combination module that combines the sampled signaling events and the respective timestamp and generates an event trace record, and a mask module that receives mask data, wherein the mask data identifies zero or more signaling events, compares the received signaling events with the mask data, and determines unmasked signaling events as the sampled signaling events that do not match with the signaling events identified by the mask data. The trace module may include a detection module that detects changes of the unmasked signaling events and generates save commands responsive thereto to enable saving of the event trace records.

The controller system may include a storage module for storing one or more event trace records in response to receipt of corresponding save commands, wherein the storage module provides an overflow signal for setting and clearing one or more overflow bits of a current event trace record upon unsuccessful storage of a preceding event trace record or upon successful storage of the preceding event trace record.

A change of an unmasked signaling event includes a setting or resetting of the unmasked signaling event. Generating the save command may be in response to a change of a single unmasked signaling event or in response to a change of a combination of unmasked signaling events. The controller system can be a part of an integrated circuit incorporated in a chip. The event subsystem may include one or more multiplexers, and the multiplexers may route the signaling events in event channels.

The controller system may be coupled to one or more devices for saving and/or viewing the event trace records. The devices may include a dedicated event trace buffer, a dedicated physical trace port, an existing trace port, wherein the existing trace port is configured to be shared, or an onboard direct access memory channel coupled to an onboard static random access memory.

Identifying one or more unmasked signaling events may include receiving mask data identifying zero or more signaling events, comparing the sampled signaling events with the mask data, and determining unmasked signaling events as the sampled signaling events that do not match with the signaling events identified by the mask data.

Generating an event trace record may include receiving an overflow signal, the overflow signal indicating success or failure of a preceding save command to save an event trace record and modifying an overflow bit of a current event trace record according to the received overflow signal, wherein setting the overflow bit when a preceding event trace record failed to be saved. An overflow bit of a current event trace record may be cleared when a preceding event trace record is successfully saved.

Aspects of the invention may implement none, one or more of the following advantages. Proposed systems and methods can be used in conjunction with an event storage module so as to enable saving of the signaling events along with a timestamp indicating a corresponding time of the signaling event.

The details of one or more implementations are set forth in the accompanying drawings and the description below. Other aspects, features, and advantages will be apparent from the description and drawings, and from the claims.

DETAILED DESCRIPTION

Microcontrollers can be used for controlling one or more other devices (as will be referred to hereafter as, peripheral devices). Peripheral devices may receive commands from an associated microcontroller in a device. An event system can be included in the device that enables direct peripheral-to-peripheral communication and signaling. The event system can be used to communicate a change of state in one peripheral device to one or more other peripheral devices so as to automatically trigger actions in the other peripheral devices. The event system can facilitate autonomous control and interaction of the peripheral devices without the use of resources such as a system CPU (that generates interrupts) or DMA controller, therefore reducing the complexity, size, and execution time of a program running on the microcontroller.

A change of state in a peripheral device may be referred to as a signaling event and may correspond to an interrupt condition in a peripheral device. Signaling events can directly pass to other peripheral devices using an event routing network. Additionally, signaling events can also be generated by a program running on the microcontroller.

Figure 1:
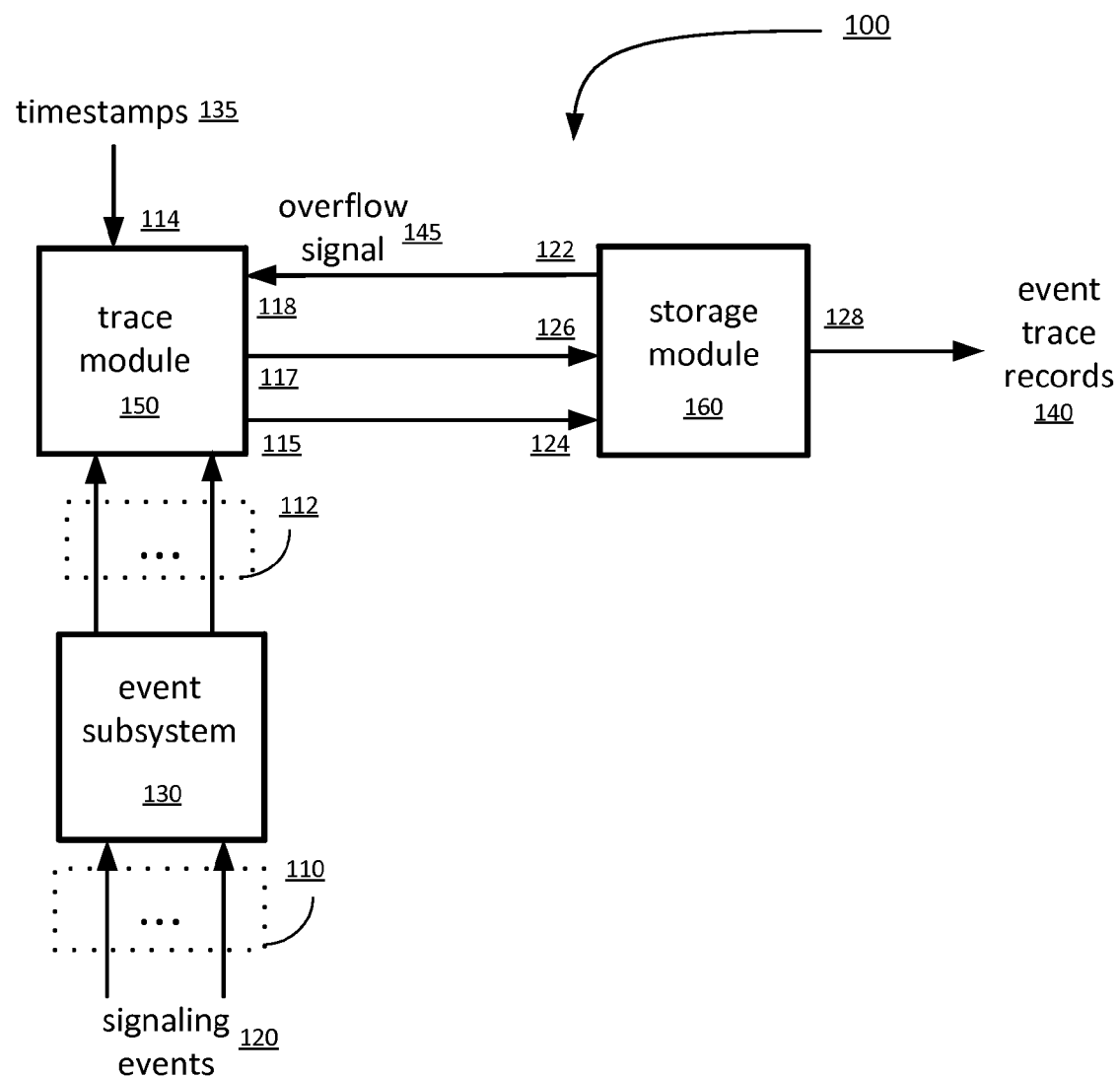
FIG. 1 is a diagram of an example controller.

Referring to FIG. 1, an example of a controller 100 is shown that includes an event subsystem 130 which receives a number of signaling events 120. The event subsystem 130 receives the signaling events 120 through different input ports 110 and provides the signaling events 120 through the event channels 112 to a trace module 150. The trace module 150 also receives, through the input port 114, the system timestamps 135 generated by the controller 100. Based on the received signaling events 120 and the timestamps 135, the trace module 150 generates event trace records and save commands. The event trace records and save commands are respectively delivered through the output ports 115 and 117 to a storage module 160. The trace module 150 is described below with respect to FIG. 2.

The storage module 160 receives the event trace records through the input port 124 and the save commands through the input port 126. In response to receiving a save command from the input port 126, the storage module 160 saves the corresponding event trace record received from the input port 124. The storage module 160 stores one or more event trace records 140 and may deliver the saved event trace records 140 at the output port 128.

The event subsystem 130 receives the signaling events 120 from peripheral devices and routes the signaling events through event channels among peripheral devices. An example of an event subsystem 130 is described with respect to FIG. 6. The event subsystem 130 may use multiplexers for routing event signals that are received from the event sources to event consumers. The signaling events received by the event consumers (the devices that are monitoring the events) can trigger one or more corresponding actions. Routing latency in the event subsystem 130 may exist indicative of a delay from when a signaling event is received/generated until the time the event actions in other peripherals are triggered.

In some implementations, the storage module 160 may be of the form of a dedicated event trace buffer for saving the event trace records. In some implementations, the storage module 160 may be coupled to a dedicated physical trace port or may be coupled to an existing trace port being configured to be shared for saving the event trace records. In some implementations, the storage module 160 can be coupled to an onboard direct access memory channel which is coupled to an onboard static random access memory for saving the event trace records. In some implementations, the storage module 160 can be coupled to an external buffer using an Ethernet port or universal serial bus (USB) port.

In some implementations, the storage module 160 may deliver an overflow signal 145 through the output port 122 of the module 160 to input port 118 of the trace module 150.

The overflow signal 145 may be used by the storage module 160 to indicate to the trace module 150 that the storage module 160 succeeded/failed to execute a latest save command of the trace module 150 and an event trace record associated with the latest save command was/was not saved. As an example, a voltage value may be used for the overflow signal 145 wherein a high voltage value may indicate a success and a low voltage value may indicate a failure, or vice versa.

In some implementations, the controller 100 can be implemented as an integrated circuit on a microcontroller chip and the system timestamps may be based on a system clock on the chip. In some implementations, the event trace records 140 generated at the output 128 of the storage module 160 may be combined with an instruction trace of the microcontroller's program, both traces using the same timestamps and producing a combined trace of the program instructions and signaling events.

Figure 2:
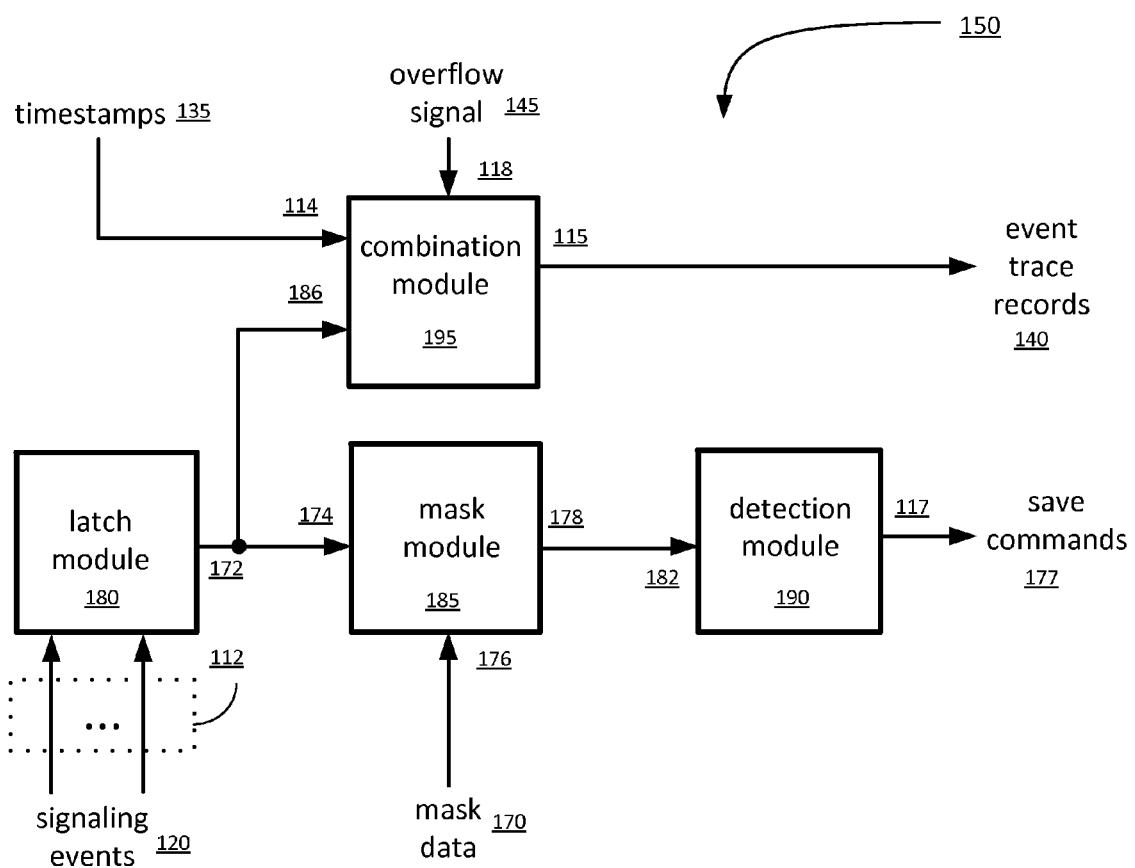
FIG. 2 is a diagram of an example trace module.

FIG. 2 illustrates an example of a trace module 150. The trace module 150 includes a latch module 180. The latch module 180 receives the signaling events 120 through the event channels 112. The latch module 180 can be configured to sample and hold the signaling events passing through the event channels 112. The latch module 180 transfers the sampled signaling events through the output port 172 to a mask module 185. In some implementations, a signaling event may synchronously be sampled. In some implementations, edge detectors may be used for asynchronous sampling of the signaling events.

The mask module 185 receives the sampled signaling events through the input port 174. The mask module 185 also receives the mask data 170 through the input port 176. The mask data indicates the signaling events that may be masked. The masked signaling events are the events that are not traced/monitored and in some implementations can be discarded. Based on the received mask data, mask module 185 can inhibit the signaling events that are not being monitored or traced from passing to the output port 178. Only the signaling events that are not masked, i.e., the unmasked signaling events, may pass to output port 178 of the mask module. In some implementations, the mask module 185 may mask low priority signaling events. In some implementations, the mask module 185 may not mask any signaling event.

The detection module 190 receives the unmasked signaling events through the input port 182. When a change of an unmasked signaling event is detected by the detection module 190 a save commands 177 can be generated and provided on the output port 117. The detection module 190 can generate a save command in response to a change of each one of the unmasked signaling events. In some implementations, the detection module 190 can generate the save command in response to a change of a combination of one or more unmasked signaling events occurring substantially simultaneously, in a sequence, or in a given time period. In some implementations, a change of a signaling event includes a setting and/or resetting of a signaling event.

The combination module 195 receives the sampled signaling events through the input port 186 and the timestamps 135 through the input port 114. The combination module 195 may combine the received sampled signaling events and a timestamp and generate an event trace record. The generated event trace records are provided at the output port 115 of the combination module 195. In some implementations the combination module 195 may receive an overflow signal 145 through the input port 118 and may incorporate the overflow signal 145 into the event trace records. In some implementations, the combination module 195 may include a memory buffer for combining the sampled signaling events and a timestamp, thereby creating an event trace record. As an example, the memory buffer may include one or more bits designated for the sampled signaling events, one or more bits designated for a timestamp, and at least one bit for incorporating the overflow signal 145.

As described with respect to FIG. 1, the respective output ports 115 and 117 of the combination module 195 and the detection module 190 may be coupled to the storage module 160 to enable saving the event trace records. The storage module 160 may generate the overflow signal 145 to indicate to the combination module 195 that the storage module 160 failure or success in executing the save command.

In some implementations, each event trace record includes a single overflow bit and each saved event trace record may indicate if a preceding event trace record failed/succeeded to be saved. As an example, by checking the overflow bit of the event trace records, a user of the event trace records can find out if any gap in the saved signaling events exists. In some implementations, the event trace records may include between one and ten (e.g., 5) overflow bits. In some implementations, the overflow bits may indicate a number of consecutive failures or successes.

In some implementations, any two or more modules including the latch module 180, the mask module 185, the detection module 190, and the combination module 195 can be joined into a single command module that performs the functions of the combination.

Figure 3:
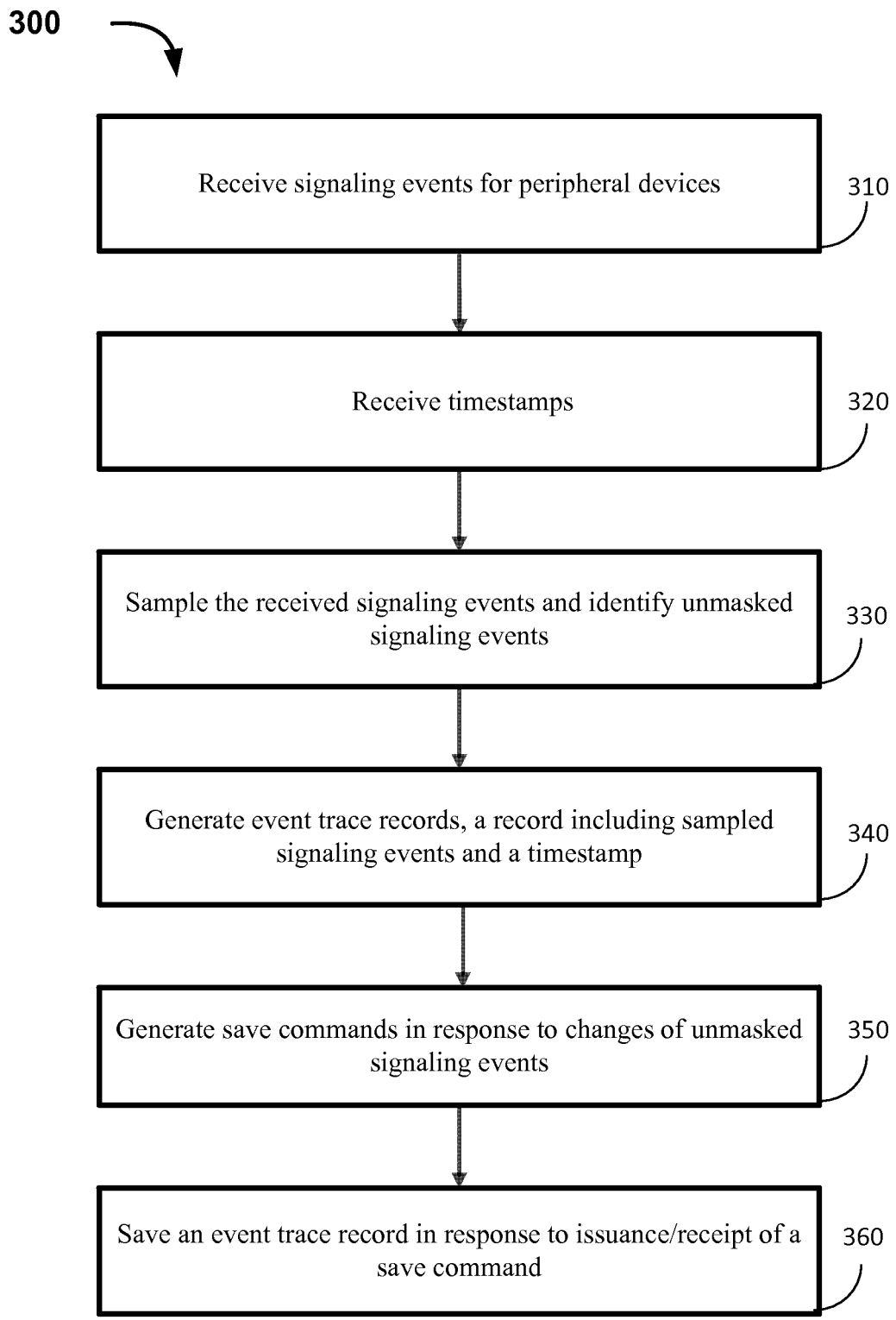
FIG. 3 is a flow diagram of an example method for saving event trace records.

Referring to FIG. 3 a flow diagram of a method 300 is shown. As an example, the method 300 can be performed by the system 100 of FIG. 1. The method includes receiving signaling events for peripheral devices (310). Each peripheral device can generate one or more signaling events in response to a condition such as a change in their state. The signaling events can be received by an example event subsystem 130 shown in FIG. 1. The signaling events of peripheral devices can be generated in parallel and therefore the signaling events that are transferred to the event subsystem may simultaneously be available.

The timestamps are received (320). As an example, the event subsystem 130, transfers the signaling events on parallel event channels 112 and the trace module 150 can access the event channels and receive one or more signaling events based on the access. The trace module may also receive timestamps. In some implementations, system timestamps are internally generated with reference to a system clock of the system 100 and the system timestamps may be made available to every module of the system 100. In some implementations, the system clock that assists in generating the timestamps is a precise clock.

The received signaling events are sampled and unmasked signaling events are identified (330). As an example, the sampling of the signaling events is performed by a latch module 180. The routing of the signaling events among peripheral devices may not be affected by the sampling of the signaling events. The signaling events can last a few clock cycles and the sampling time period can be set to ensure signaling events are not lost. A portion of the steps performed in trace module 150 are described with respect to FIG. 4 wherein a group of the received and sampled signaling events may be selected for monitoring/actions and the rest can be discarded. As an example, mask module 185 can filter out received signaling events and only the unmasked signaling events are transferred.

In some implementations, the signaling events may last a very short period of time and synchronous sampling may not be performed. In some implementations, the latch module may use edge detectors for asynchronous detection and latching of the signaling events.

Event trace records are generated wherein each event trace record includes sampled signaling events and a timestamp (340). As an example, event trace records are generated by the combination module 195 and each event trace record includes a group of one or more sampled signaling events and a timestamp indicating a corresponding time of the sampling. In some implementations, the time of the timestamp is a time associated with the generation of the signaling event. In some implementations, the combination module 195 may incorporate one or more overflow bits in each event trace record. Setting or clearing the overflow bit(s) of the event trace records is described with respect to FIG. 5.

Save commands are generated in response to changes of unmasked signaling events (350). In some implementations, when a change of one or more of the unmasked signaling events is detected, a save command can be generated. As an example, the detection of a change of the unmasked signaling events may occur in the detection module 190 wherein upon a change of an unmasked signaling event from set to reset (clear) and/or from reset to set, a save command can be generated and the save command may cause an example storage module 160 to save an event trace record. In some implementations a change of a combination of signaling events from set to reset and/or from reset to set may generate a save command.

In response to issuance/receipt of a save command, an event trace record is saved (360). As an example, a storage module 160 external to the trace module 150 receives the save commands and the event trace records through the ports 126 and 124 respectively. When a save command is received by the storage module 160, in response, the storage module 160 saves the content of the event trace record that is delivered at the input port 124 of the module 160. In some implementations, one or more event trace records are saved in the storage module 160.

In some implementations, the system timestamps can be shared with a debugger module configured for generating instruction trace records of one or more software programs. Combining the event trace records 140 with instruction trace records that share the same timestamp can yield a combined trace record of the program instructions and signaling events.

In some implementations, the event trace records 140 may be combined with the other records based on respective timestamps. As an example, the event trace records may be combined with the time stamped power measurements.

Figure 4:
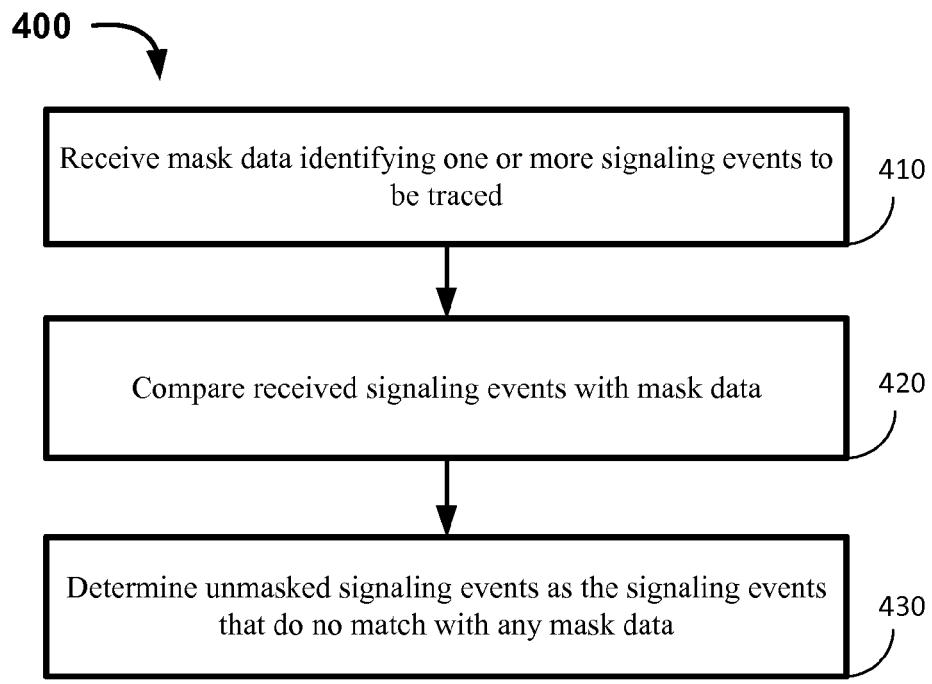
FIG. 4 is a flow diagram of an example method for determining unmasked signaling events.

Referring to FIG. 4, the flow diagram of a method 400 is shown. The method 400, for example, can be performed in the mask module 185. The method includes receiving mask data that identifies one or more signaling events to be traced (410). In some implementations, the signaling events identified by the mask data are the ones that are not selected for tracing and may be ignored and no save command may be generated when the signaling events identified by the mask data occur.

Received signaling events are compared with the masks data (420). An example mask module 185 receives all signaling events. The mask data indicates which signaling events may be ignored. Comparing the received signaling events with the signaling events designated by the mask data and finding the matches enable the identification of the singling events that are not to be further processed (e.g., and can be discarded).

The signaling events that do not match with the signaling events in the mask data are determined as unmasked signaling events (430). The unmasked signaling events are the ones that can result in the production of a save command and may cause an event trace record to be saved. The signaling events that are masked are not traced and may not cause an event trace record to be saved.

Figure 5:
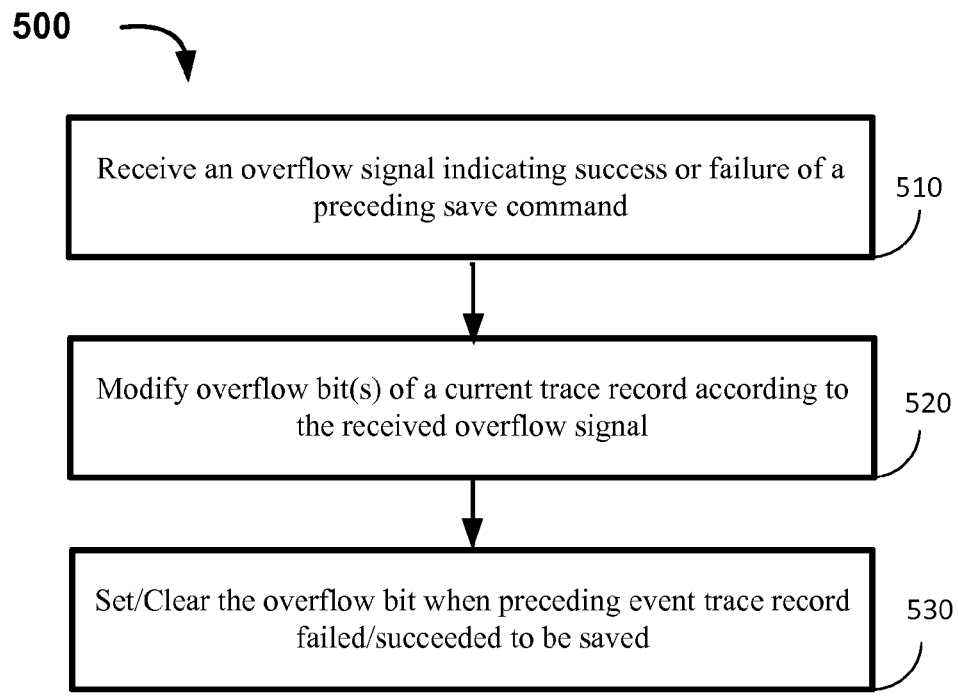
FIG. 5 is a flow diagram of an example method for setting/clearing an overflow bit.

Referring to FIG. 5, the flow diagram of a method 500 is shown. As an example, the method 500 can be performed by the combination module 195 of FIG. 2 so as to set or clear the overflow bit(s) of an event trace record. An overflow signal indicating success or failure of a preceding save command is received (510). As an example, the overflow signal 145 is received by the input port 118 of the combination module 195. In some implementations the overflow signal 145 is received from an example storage module 160 that can store the event trace records.

The overflow bit(s) of a current event trace record is modified according to the received overflow signal (520). In some implementations, each event trace record may include one or more overflow bits and the overflow bit(s) is modified according the received overflow signal.

The overflow bit is set/cleared when the preceding trace record failed/succeeded to be saved (530). As an example, the combination module 195 sets or clears the overflow bit of a current event trace record. In some implementations, the overflow bit can be set when the preceding event trace record failed to be saved and is cleared (reset) when the preceding event trace record succeeded to be saved.

Figure 6:
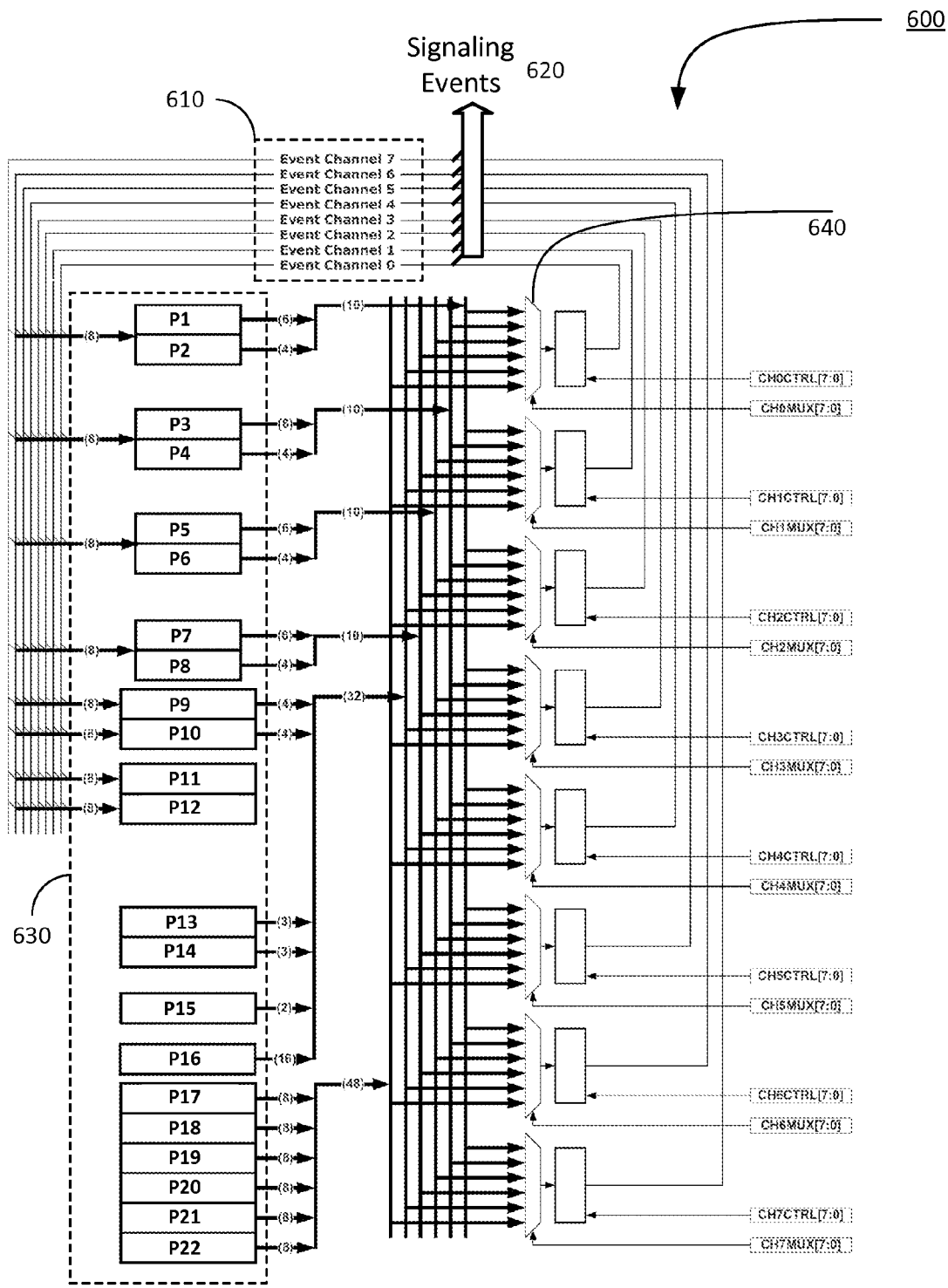
FIG. 6 is a diagram of an example event subsystem.

Referring to FIG. 6, an example of a subsystem 600 for routing the signaling events is displayed. The subsystem 600 includes 22 peripheral devices 630 and 8 multiplexers 640 for routing the signaling events through 8 event channels 610. By providing access to the event channels 610, the signaling events 620 can be delivered as outputs.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
an event subsystem that receives signaling events generated by two or more associated peripheral devices, wherein the signaling events are transferred between peripherals using multiplexed, parallel event channels of an event routing network without the use of a central processing unit (CPU) interrupt or a direct memory access (DMA) controller, wherein the signaling events allow or control a change of state in one peripheral device to automatically trigger an action on another peripheral device;
a trace circuit coupled to the event subsystem that:
receives the signaling events,
samples the received signaling events,
receives timestamps,
generates event trace records, wherein each event trace record includes the sampled signaling events and a respective timestamp indicative of the sampling time,
generates save commands, and
delivers the event trace records and the save commands as outputs.

2. The system of claim 1, wherein the trace further comprises:
a latch circuit that samples the received signaling events;
a combination circuit that combines the sampled signaling events and the respective timestamp and generates an event trace record;
a mask circuit that
receives mask data, wherein the mask data identifies zero or more signaling events,
compares the received signaling events with the mask data, and
determines unmasked signaling events as the sampled signaling events that do not match with the signaling events identified by the mask data; and
a detection circuit that detects changes of the unmasked signaling events and generates save commands responsive thereto to enable saving of the event trace records.

3. The system of claim 2, further comprising a storage circuit for storing one or more event trace records in response to receipt of corresponding save commands, wherein the storage circuit provides an overflow signal for setting and clearing one or more overflow bits of a current event trace record upon unsuccessful storage of a preceding event trace record or upon successful storage of the preceding event trace record, respectively.

4. The system of claim 3, wherein the storage circuit is coupled to one or more devices for saving and/or viewing the event trace records, the devices including:
a dedicated event trace buffer,
a dedicated physical trace port,
an existing trace port, wherein the existing trace port is configured to be shared, or
an onboard direct access memory channel coupled to an onboard static random access memory.

5. The system of claim 2, wherein a change of an unmasked signaling event includes a setting or resetting of the unmasked signaling event.

6. The system of claim 2, wherein generating the save command is in response to a change of a single unmasked signaling event.

7. The system of claim 2, wherein generating the save command is in response to a change of a combination of unmasked signaling events.

8. The system of claim 1, wherein the system is a part of an integrated circuit incorporated in a chip.

9. The system of claim 1, wherein the event subsystem includes one or more multiplexers, and wherein the multiplexers route the signaling events in event channels.

10. A method comprising:
receiving, by an event subsystem of a system, signaling events for two or more peripheral devices, wherein the signaling events are transferred between peripherals using multiplexed, parallel event channels of an event routing network without the use of a central processing unit (CPU) interrupt or a direct memory access (DMA) controller, wherein the signaling events allow or control a change of state in one peripheral device to automatically trigger an action on another peripheral device;
receiving timestamps corresponding to an event time for a given signaling event;
sampling the received signaling events including identifying one or more unmasked signaling events;
receiving timestamps corresponding to a sampling time for the one or more unmasked signaling events;

generating event trace records, wherein each event trace record includes the sampled unmasked signaling events and a respective timestamp indicative of the sampling time;

generating save commands in response to changes of the unmasked signaling events; and saving an event trace record in response to a save command in an external device.

11. The method of claim 10, wherein identifying one or more unmasked signaling events includes:

receiving mask data identifying zero or more signaling events;

comparing the sampled signaling events with the mask data; and determining unmasked signaling events as the sampled signaling events that do not match with the signaling events identified by the mask data.

12. The method of claim 11 further comprising clearing an overflow bit of a current event trace record when a preceding event trace record is successfully saved.

13. The method of claim 10, wherein a change of an unmasked signaling event includes a setting or resetting of the unmasked signaling event.

14. The method of claim 10, wherein generating an event trace record further comprises:

receiving an overflow signal, the overflow signal indicating success or failure of a preceding save command to save an event trace record, modifying an overflow bit of a current event trace record according to the received overflow signal, wherein setting the overflow bit when a preceding event trace record failed to be saved.

15. The method of claim 10, wherein generating the save command is in response to a change of a single unmasked signaling event.

16. The method of claim 10, wherein generating the save command is in response to a change of a combination of unmasked signaling events.

* * * * *